(12) United States Patent
Schneider

(10) Patent No.: US 11,163,925 B1
(45) Date of Patent: Nov. 2, 2021

(54) METHODS AND SYSTEMS FOR OPERATING MICROGRIDS USING MODEL PREDICTIVE CONTROL

(71) Applicant: Stephen Schneider, Stamford, CT (US)

(72) Inventor: Stephen Schneider, Stamford, CT (US)

(73) Assignee: Enernet Global, LLC, New York, NY (US)

( * ) Notice: Subject to any disclaimer, the term of this patent is extended or adjusted under 35 U.S.C. 154(b) by 213 days.

(21) Appl. No.: 16/396,738

(22) Filed: Apr. 28, 2019

Related U.S. Application Data

(60) Provisional application No. 62/663,989, filed on Apr. 27, 2018.

(51) Int. Cl.
| | |
|---|---|
| *G06F 30/20* | (2020.01) |
| *G05B 17/02* | (2006.01) |
| *H02J 3/00* | (2006.01) |
| *G06F 119/06* | (2020.01) |

(52) U.S. Cl.
CPC ............. *G06F 30/20* (2020.01); *G05B 17/02* (2013.01); *H02J 3/00* (2013.01); *G06F 2119/06* (2020.01); *H02J 2203/20* (2020.01)

(58) Field of Classification Search
CPC ..... G06F 30/20; G06F 2119/06; G05B 17/02; H02J 3/00; H02J 2203/20
See application file for complete search history.

(56) References Cited

U.S. PATENT DOCUMENTS

| | | | |
|---|---|---|---|
| 8,261,226 B1* | 9/2012 | Becker | G06F 30/394 |
| | | | 716/126 |
| 2005/0021742 A1* | 1/2005 | Yemini | G06Q 10/04 |
| | | | 709/224 |
| 2018/0316188 A1* | 11/2018 | Ishchenko | H02H 7/28 |

OTHER PUBLICATIONS

Kremers et al. "A Complex Systems Modelling Approach for Decentralised Simulation of Electrical Microgrids". 2010 15th IEEE International Conference on Engineering of Complex Computer Systems. OagesL 302-3111. (Year: 2010).*

Ustun. "Modeling Electrical Networks With Object Oriented Data Structures for Smart Control". IEEE. 2014, 7 Pages. (Year: 2014).*

(Continued)

*Primary Examiner* — Eunhee Kim
(74) *Attorney, Agent, or Firm* — Law Office of John Stattler

(57) ABSTRACT

A simulator models an energy and power system. The simulator allows a user to manipulate digital representations of nodes, which represent one or more components of power and energy assets. The simulator also allows a user to manipulate digital representations of edges, which connect the nodes, to form a power and energy network. A plurality of object classes correspond to the nodes and edges. The object classes comprise class inheritance structures so that constraints of a parent class are retained by one or more child classes. The interface on the simulator allows a user to model a power and energy system by allowing the user to connect the nodes with edges to construct a power and energy system, wherein the object classes for the nodes, when executed by the simulator, implement one or more dynamical models to model the power and energy assets.

18 Claims, 9 Drawing Sheets

(56) References Cited

OTHER PUBLICATIONS

Chen. "Multi Agent System-Based Simulation of a Laboratory-Scale Microgrid". The Pennsylvania State University The Graduate School The School of Science, Engineering and Technology. Aug. 2014. 55 Pages. (Year: 2014).*

Sachs et al. "A Two-Stage Model Predictive Control Strategy for Economic Diesel-PV-Battery Island Microgrid Operation in Rural Areas". IEEE Transactions On Sustainable Energy, vol. 7, No. 3, Jul. 2016. pp. 903-913. (Year: 2016).*

\* cited by examiner

Fundamental Building Blocks

Building Block Subclasses

METHODS AND SYSTEMS FOR OPERATING MICROGRIDS USING MODEL PREDICTIVE CONTROL

RELATED APPLICATIONS

The present application claims priority under 35 U.S.C. § 119 to Provisional Application No. 62/663,989, entitled "Model Predictive Control for Microgrid Operation Using Dynamical Models Based on an Object-Oriented Graph Framework with Constraint Inheritance", filed Apr. 27, 2018, inventor, Stephen Schneider, and is incorporated herein by reference in its entirety.

BACKGROUND

Field

The present invention relates to the field of energy management systems, and more particularly towards power systems and techniques to manage power assets.

Background

Designing an electrical power system, such as a microgrid, is a complex process. It requires background in power engineering, renewables, generation sets, like diesel gensets or natural gas gensets, as well as control algorithms to ensure proper dispatch of load handling across the participating generation assets.

Model Predictive Control (MPC) problems are notoriously difficult to work with as logging timesteps, updating variables, and bootstrapping are error-prone and require significant overhead work. The present disclosure employs, in some embodiments, a framework where MPC problems are dynamically constructed based on standard software class-inheritance principles and node-edge graphs. Some embodiments of the present disclosure sets forth software classes that have constraints, formulated such that they define the dynamical models of the assets they represent. For example, a constraint defines the relationship between fuel consumption and power output in a generator.

BRIEF DESCRIPTION OF THE DRAWINGS

FIG. 2b illustrates building blocks for subclasses of the building blocks shown in FIG. 2a.

DETAILED DESCRIPTION

Figure 1:
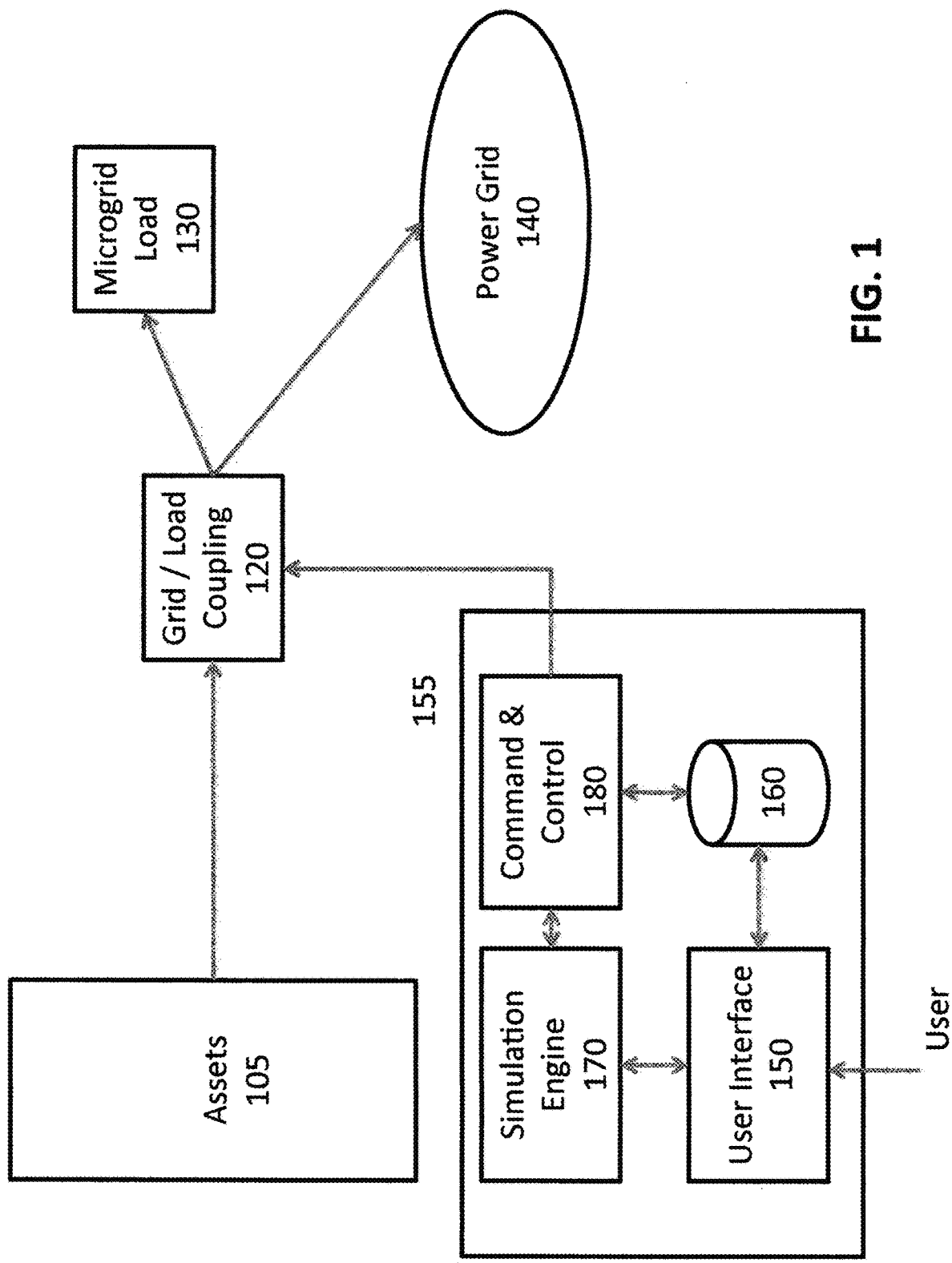
FIG. 1 is a block diagram illustrating embodiments for a renewable energy system that incorporates techniques disclosed herein.

FIG. 1 is a block diagram illustrating embodiments for a renewable energy system that incorporates techniques disclosed herein. The energy system includes a collection of assets, labeled as assets 105 in FIG. 1. Assets 105 represents a broad category of power and energy system assets, including generators, storage systems, reverse osmosis systems, water tanks, etc., as well as renewable assets, such as solar systems, wind turbines, geothermal, etc. Assets 105 is shown coupled to either a microgrid load 130 or power grid 140, or both, via grid/load coupling 120. As such, the assets source power to a microgrid load 130 or power grid 140, or both.

The energy and power system of FIG. 1 includes an energy system modeling unit 155.

In general, energy system modeling unit 155 allows users of the system to model and simulate performance of a collection of assets across a plurality of variables and constraints.

For the embodiments illustrated in FIG. 1, the energy system modeling unit 155 includes user interface 150. In general, user interface 150 permits users to interface with the system, including the energy system modeling unit 155. Specifically, through user interface 150, users may select and manipulate digital representations of nodes, which represent one or more components of a power and energy system, to configure power and energy systems for modeling. In addition, the user interface 150 permits a user to select and manipulate digital representations of a plurality of edges, so as to allow the user to connect the nodes of the power and energy network with the edges.

As shown in FIG. 1, user interface 150 is coupled to database 160 and simulation engine 170. Database 160 stores, in part, digital representations of the nodes and edges, object classes, as well as one or more models used to model the energy and power system in accordance with the techniques described herein. In addition, database 160 may store additional information used to model and simulate energy and power systems accordance with the techniques described herein.

The power system management unit 255 also includes a command and control unit 280. Command and control unit 280 is coupled to grid/load coupling 220, so as to control the power coupling from battery collection 210 to an output load, including micro-grid load 230 and power grid 140.

Simulation engine 170 executes simulations to predict performance of energy and power systems configured by the user via the user interface 150. Embodiments for executing simulations in simulation engine 170, are described more fully below.

The simulation disclosed herein also supports the design, development and deployment of isolated power systems (i.e., not connected to a power grid). In some embodiments, the power system comprises both one or more generators and energy storage (batteries). For these embodiments, reserves are simulated, using the techniques disclosed herein, for both the generator and the battery assets. The sum of these reserves may be coupled to power grids or may be coupled to isolated loads. The nature of the dynamical models of the assets, and their power and energy variables, permits combining both least-cost energy objectives with both reserve constraints and revenues.

In some embodiments, reserve allocation from the power systems configured herein is facilitated when the assets output power to a single point of common coupling. However, in other embodiments, the techniques disclosed herein for reserve allocation may be adapted to incorporate constraints imposed by other network topologies where the power reserves pass through a series of nodes and edges.

The following nomenclature is set forth to teach embodiments for generating dynamic models for used by the simulator. However, one skilled in the art will recognize that other conventions and equations may be used in the simulator for bootstrapping MPC simulations without deviating from the spirit or scope of the invention. Specifically, the following disclosure sets forth variables, constraints and objectives for some embodiments for MPC simulations.

MPC is a control policy which selects time-series (vector) values for control variables in a planning problem. The term "Model" in Model Predictive Control, refers to the use of dynamical models which capture the objectives and constraints of a system. The focus on a "planning problem", in the simulations disclosed herein, is that MPC is a forward looking control policy, which makes decisions for future periods based on forecasts. Rather than consume stochastic forecasts about future variables, which are difficult to estimate or obtain, MPC simply consumes a single prediction for future quantities. In statistical terms, it consumes only the expected value of the variable. The nature of making a forecast of all variables informs the present timestep to make a better control decision. In some applications, such as in energy markets, the forecast itself can be used to make market commitments.

The constraints of the MPC problem are represented as a system of equations, closely representing first principles. The objective of a system is a single expression resulting in a scalar value that can be minimized or maximized. MPC often employs optimization techniques as the system of equations in this problem class frequently require iterative methods to solve.

In the examples on microgrids disclosed herein, we focus on the system constraints. The system constraints define the operational principles of the system, such as capabilities and physical limitations. The constraints of a MPC problem, or an optimization problem more broadly, define the solution space. In the equations below, we describe the solution space for a select set of power and energy assets and their collective operation.

The symbols, $\succcurlyeq$ and $\preccurlyeq$ are used to indicate element-by-element comparisons of vectors and matrices rather than using standard equality symbols, $\geq$ and $\leq$, as the latter symbols have special meanings in linear algebra. However, the standard equality symbols are used for constants.

The variable P[t], as used herein, represents instantaneous active power. However, with discrete timesteps, there is only average power, such that $P[t]=P_{ave}[t]$. The value of $P_{ave}[t]$ may be positive or negative. The sign conventions are defined herein such that $P[t] \succcurlyeq 0$, when exporting power, and $P[t] \preccurlyeq 0$, when importing power. Thus, $P_{load} \succcurlyeq 0$.

$P_{ave}[t]$, as defined above, is average power over a discrete time interval. As mentioned above, this is functionally instantaneous power for discrete simulations.

$P^+_{MAX}$ is defined as the maximum power export capacity. For a generator, this defines the maximum output. For a battery, this defines the discharging capacity, such that $P^+_{MAX} \geq 0$.

$P^-_{MAX}$ is defined as the maximum power import capacity. For a generator, this is equal to zero. For a battery, this represents the charging capacity, $P^+_{MAX} \geq 0$.

The variable, f, defines power flow along an edge; it is directional and always positive.

$P_{asset}^+[t]$ represents power reserve constraints are set by the ability of an asset to change an instantaneous power set point to either import ($P^-$), or export ($P^+$), more power. Our sign convention is such that $P_{asset}^+[t] \succcurlyeq 0$.

Timesteps: Average power is equal to the change in energy over time, and thus has the units of J/s. With discrete steps, this is written simply as:

$$P_{ave} \Delta E / \Delta t$$

A bracket [ ] notation is used herein to indicate discrete timesteps, zero-indexed. Written with time-indexing and dropping the "average" notation, the expression becomes:

$$P[t]=E[t+1]-E[t]$$

Filling in values for t, say t=1. For simplicity, let's assume that $\Delta t=1$: $P[1]=E[1]-E[0]$. As one can see, there is an annoyance that at t=0, in a zero-indexed language, E[−1] does not exist:

$$P[0]=E[1]-E[-1]$$

Additionally, the length of vector P is one unit shorter than the length of vector E. The convention used herein is that the indexing of derivatives is shifted at the beginning of the vectors, such that:

$$P[0]=E[1]-E[0]$$

Or, more formally with our $\Delta t$ back in:

$$P[t]=E[t+1]-E[t]/\Delta t$$

Further, if we define a ramp rate, $R=\Delta P$:

$$R[t] = \frac{P[t+1] - P[t]}{\Delta t}$$

These fundamental equations are implemented as low level constraints and apply to all electrical elements. The use of low level contraints applied to the electrical elements may be applied to energy, power and ramp rate. Care must be taken while plotting values of E, P, and R. A simple mechanism is to plot E on the hour and P at midpoints during the hour. For a one-day period with hourly intervals, the length of vector E, expressed using the first norm, $|\vec{E}|=25$ and $|\vec{P}|=24$, such that the first and last values of $\vec{E}$ correspond to midnight on the first and second day, respectively. Load profiles with 8760 datapoints provided by customers are $P_{ave}$, such that we have 8760 values for power and 8761 values for energy states. Typically, E[0] is set as an initial condition by the simulator using the techniques for bootstraping disclosed herein.

With reference now to energy storage variables, E[t] may be defined as the energy state of the storage system. Separate variables are defined for charging and discharging a storage system, and these variables are incorporated into the various power equations. The variable, $P_{in}[t]$, represents storage charging power level, in each timestep, such that:

$$P_{in}[t] = \begin{cases} P[t], & P[t] \geq 0 \\ 0, & \text{otherwise} \end{cases}$$

The variable, $P_{out}[t]$, represents storage discharging power level, in each timestep, such that:

$$P_{out}[t] = \begin{cases} -P[t], & P[t] < 0 \\ 0, & \text{otherwise} \end{cases}$$

Note that unless a storage system can charge and discharge at the same time, the relationship $P[t]=P_{in}[t]-P_{out}[t]$ holds true. This can be the case where the charging and discharging infrastructure are decoupled, say a pump in one location and a turbine in another.

With reference now to energy contraints, basic energy limits define the envelope of the storage system operation, $E_{MIN}=0$ MWh. While the lower bound is expressed here as being zero, this could just as easily represent a minimum state of charge. Our maximum energy level in the battery, $E_{MAX}$, is equal to the energy capacity of the battery. $E_{MAX}$ may be a function of time or use to capture degradation of the battery. Naturally, the energy state variable, $E[t]$, must always stay within these bounds to prevent being over filled or over depleted, $E_{MIN} \leq E[t] \leq E_{MAX}$.

With reference now to power contraints, basic power constraints limit charging and discharging of a storage system to at or below the respective rated capacities, $$P_{in}[t] \leq P_{MAX}^- \text{ and } P_{out}[t] \leq P_{MAX}^+$$

In some embodiments, providing power reserves from a storage system involves two sets of constraints: power and energy, both of which are translated into units of power for the purposes of defining reserve capacity. First, the additional set of power constraints are added. Here, the following equation sets the export reserve based on the current power state to full export, $P_{storage}^+[t] \leq (P_{in}-P_{out}[t])+P_{MAX}^+$. Note that the term $(P_{in}[t]-P_{out}[t])$ will be positive if the asset is charging and negative if the asset is discharging. Likewise, import reserves in the equation $P_{storage}^-[t] \leq (P_{out}[t]-P_{in}[t])+P_{MAX}^-$, are set based on the current power state to full import. Note that first term is flipped according to our reference position.

Second, the power reserves are constrained so as to prohibit a negative energy balance while activated as a power reserve. The equation $$P_{storage}^+[t] \leq \frac{E[t+1]}{\Delta t}$$

mandates that a power reserve will never exceed the energy content in the battery, discharged in a single timestep. Note that these constraints are built on top of the power constraints. That said, because reserves are about a reference point, $P^+$ and $P^-$ may exceed their respective $P_{MAX}$ capacities. However, $P_{out}$ and $P_{in}$ are constrained to not exceed $P^+$ and $P^-$, respectively.

Likewise, to ensure the storage system would never be overfilled while importing power, the constraint $$P_{storage}^-[t] \leq \frac{E_{MAX} - E[t+1]}{\Delta t}$$

is constructed. While the energy constraints for $P_{storage}^+$ and $P_{storage}^-$ seem trivial, they ensure that limited energy storage devices provide appropriate power over the time interval. Said differently, they represent the maximum power confidently provided as calculated with the chosen discrete time step. As these are vectorized variables and constraints, every time point is taken into consideration. Given this allocation of power and energy, these reserve calculations are sufficient for making market commitments and revenue estimates.

And finally, to prevent double-dipping in power markets with the same asset, the sum of all the power commitments in all markets cannot exceed the limit equations defined in the four equations below.

$$P_{storage|n}^+[t] \leq \frac{\min(E[t+1:t+1+n])}{n\Delta t}$$

With regard to revenue variables and constraints, all variables represent column vectors, such that $a^T b$ yields a scalar value. Also, defined herein is the notation that $a \cdot b$ as the element-by-element multiplication rather than a dot-product. Positive reserve prices are given by $\rho$ and negative reserve prices are given by $v$. This term is at the heart of the portfolio optimization. It is itself a scalar value that can be maximized with a clear chain of constraints that lead back to the dispatch of the storage system.

$$\sum_{m=markets, n=1,...,N} \rho_m^T P_{storage|n,m}^+[t] + v_m^T P_{storage|n,m}^-[t]$$

Now, with regard to generators, the following variables are defined for the purposes of describing the techniques and system of the present disclosure.

$G_{MIN}$: minimum generator output, for which a generator cannot run below a given threshold. This is provided as a percent.

$F_I$: Fuel consumption intercept or the fixed fuel consumption of running a generator. In units of L/h/kW, so normalized to rated capacity.

$F_S$: Fuel consumption slope or the marginal fuel cost. In units of L/h/kW=L/kWh.

$F_t$: Total fuel consumed.

With regard to power constraints for generators, the power output of a generator $P_{gen}$, is constrained between zero and the maximum output, $P_{MAX}^+$:

$$P_{gen} \leq 0$$

$$-P_{gen} \leq P_{MAX}^+$$

In the equation below, the boolean, $G_{run}$, variable is constrained such that if $P_{gen}$ takes on a non-zero value, $G_{run}$ must be 1. Likewise, if $G_{run}$ is constrained to zero, $P_{gen}$ must be zero. The right hand side is normalized to be between 0 and 1 by dividing $P_{gen}$ by $P_{MAX}^+$. Using a boolean constraint, the equation forces the generator to be running if the power output is greater than zero or forces the power output to be zero if the generator is not running.

$$G_{run} \geq -\frac{P_{gen}}{P_{MAX}^+}$$

In the event that a generator has a deadband or minimum output, such that it cannot operate below an output of, say 20%, the constraint below is applied:

$$-P_{gen} \geq (P_{MAX}^+ \cdot G_{MIN}) \cdot G_{run}$$

The term in parentheses specifies the minimum output, which is only enforced while the generator is running. Note that with this constraint applied, a generator cannot provide reserves unless it is loaded to the minimum level.

Now with regard to energy constraints and generators, generators have only type of energy constraints, which is the relationship between fuel consumption and power output. Note that a fuel tank is treated as a separate system, which behaves like a storage system. The first term is the idling consumption while the second term is based on generator output. Additionally, values of $F_I$ here are normalized by peak capacity and therefore are scaled appropriately in the first term.

$$F_t = \frac{F_I \cdot P_{MAX}^+ \cdot G_{run} + F_S \cdot (-P_{gen})}{\Delta t}$$

With regard to generator power reserves, generator power reserves are more straight forward than for a storage system. For power export capacity, in the short sequence of constraints below, the capacity is first constrained to be above zero, limited by the headroom in a generator, and only make the reserves available if the generator is running.

$P_{gen}^+ \geq 0$ $P_{gen}^+ \leq P_{MAX}^+ - (-P_{gen})$ $P_{gen}^+ \leq P_{MAX}^+ \cdot G_{run}$ Likewise, for power import capacity, we first constrain the capacity to be above zero, limit by our ability to ramp down, and only make the reserves available if the generator is running. The third equation is a bit redundant, given the relationship between $G_{run}$ and $P_{gen}$, but it is maintained for consistency. $P_{gen} \geq 0 P_{gen}^- \leq -P_{gen} P_{gen}^- \leq P_{MAX}^+ \cdot G_{run}$ As demonstrated in above, the generator reserves are compartmentalized into various timescales and commitment periods.

Figure 2A:
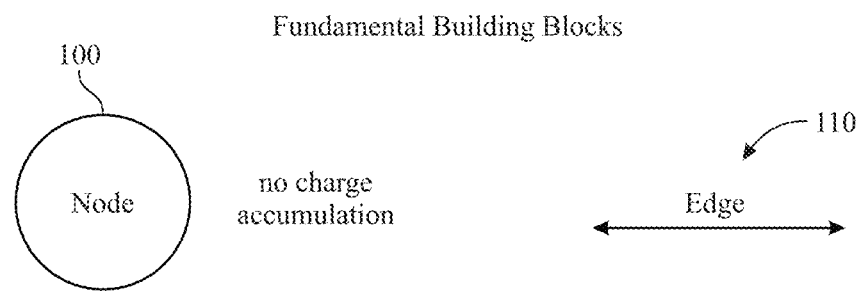
FIG. 2a illustrates the fundamental set of building blocks for energy and power system modeling that includes a node and an edge.

FIG. 2a illustrates the fundamental set of building blocks for energy and power system modeling that includes a node and an edge. For some embodiments, the fundamental building blocks include, as shown in FIG. 2A, node 100 and edge 110. A node, as used herein, represents a junction where charge is not accumulated. Thus, a node manages internal charge and an edge allows charge to flow between nodes. Starting with these building blocks guarantees that energy conservation is always applied, no matter how complex the energy system becomes. For example, flows along edges must either accumulate in a node or be disseminated along other edges.

Figure 2B:
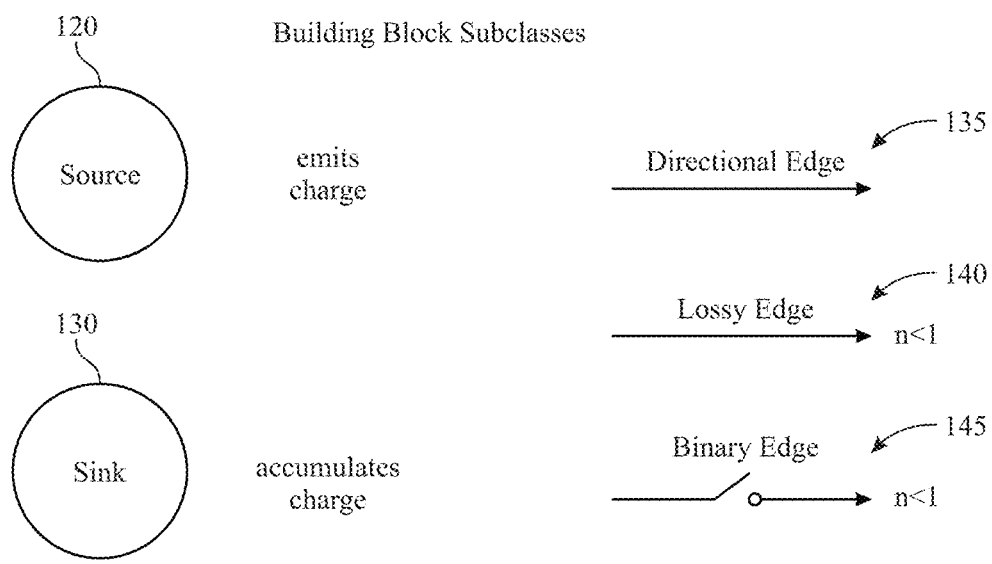

FIG. 2b illustrates building blocks for subclasses of the building blocks shown in FIG. 2A. As described more fully below, in some embodiments, a classes-inheritance structure is set up so that constraints are always additive, and build on parent classes.

For these embodiments, node subclasses include source nodes (120) and sink nodes (130). Source nodes (120) emit charge, whereas sink nodes (130) accumulate charge. The edge subclasses include, for the embodiment shown in FIG. 2B, a directional edge 135, a lossy edge 140, and a binary adage 145. A directional edge (135) represents that power flows in a specific direction. A lossy edge (140) shows energy dissipated along a path of the power network, and a binary edge (145), incorporates a switch, to allow power to either flow across the node or not flow across the node.

Figure 3:
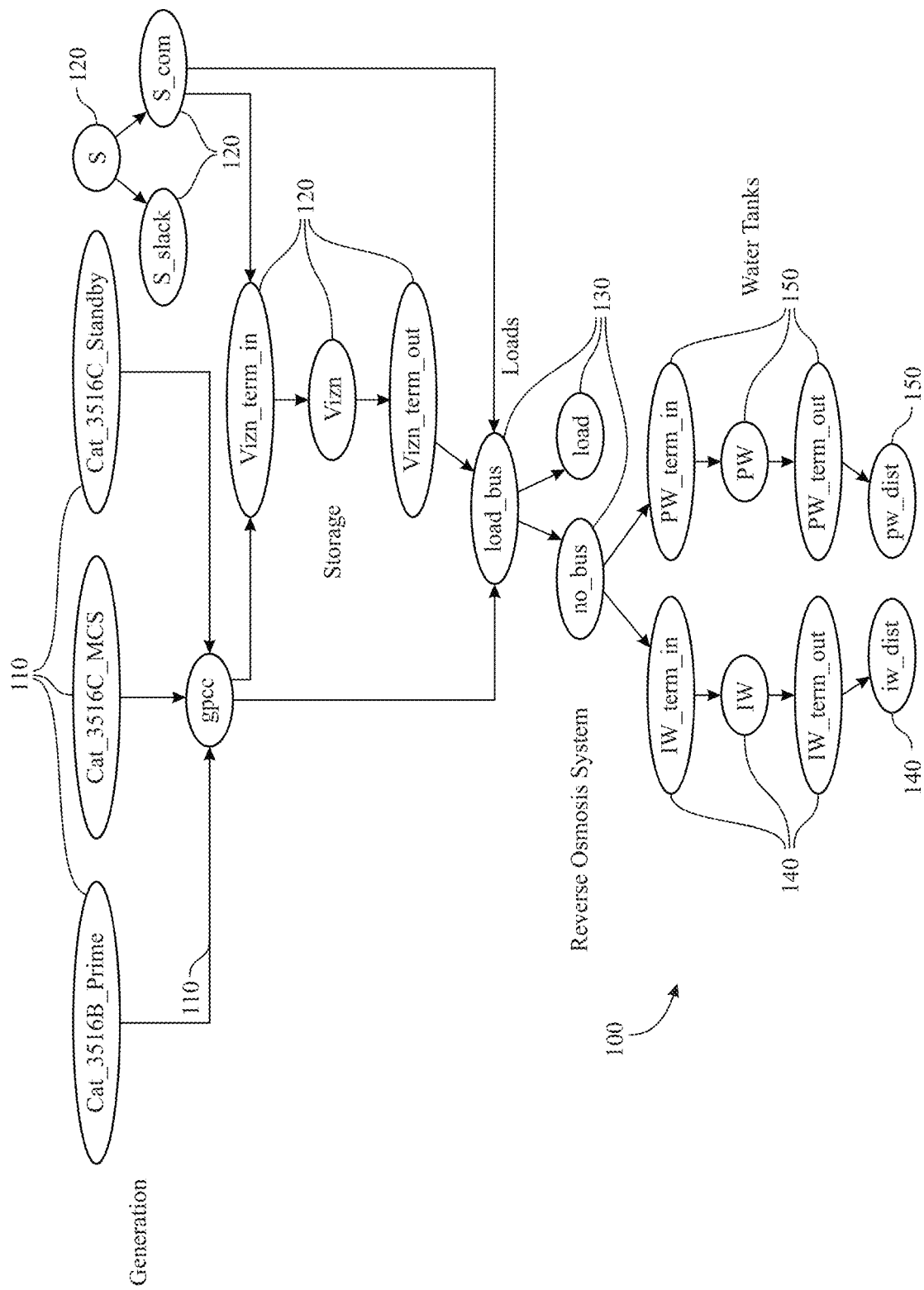
FIG. 3 illustrates in example micro-grid system modeled through representations of nodes and edges.

FIG. 3 illustrates in example micro-grid system modeled through representations of nodes and edges. In some embodiments, a micro-grid system 100 may be modeled such that the nodes and edges form collections of assets used to configure the micro grid system. The example micro-grid system 100, illustrated in FIG. 3, includes a collection of nodes and edges for generation (110), storage (120), loads (130) reverse osmosis system (140) and water tanks 150.

In some embodiments, the system is initially constructed with nodes and edges, then to collections, and then to a whole microgrid system. Due to constraint addition and class-inheritance, the system is guaranteed to obey the most elementary properties despite the final complexity. Finally, the use of a node-edge framework for microgrid design allows visual inspection of design for verification. This same framework dynamically creates optimization models used for bootstrapping and subsequent simulations.

Figure 4A:
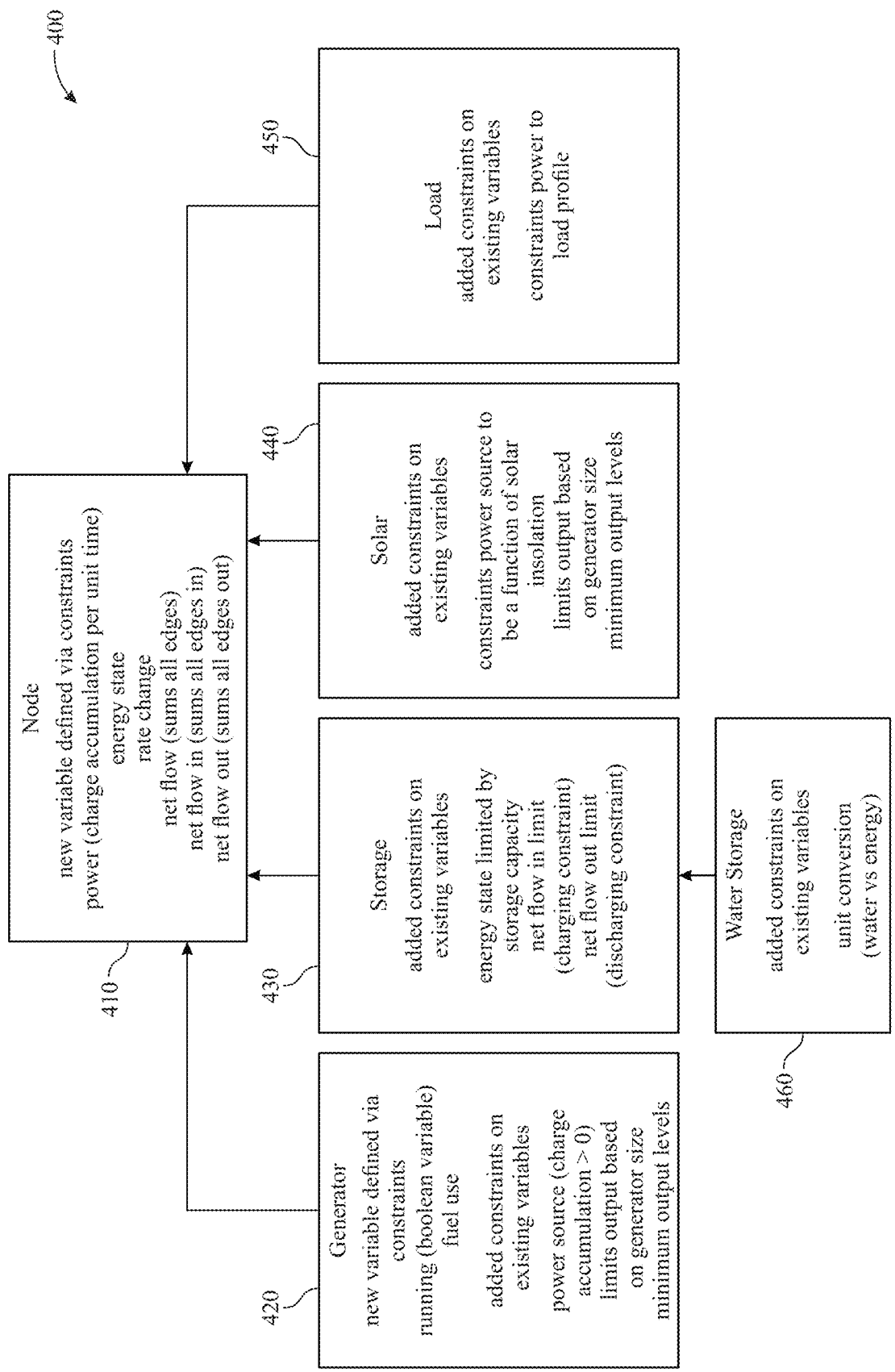
FIGS. 4a and 4b illustrate examples of a specific class inheritance mapping of some of the nodes and edges illustrated in the diagram of FIG. 3.
Figure 4B:
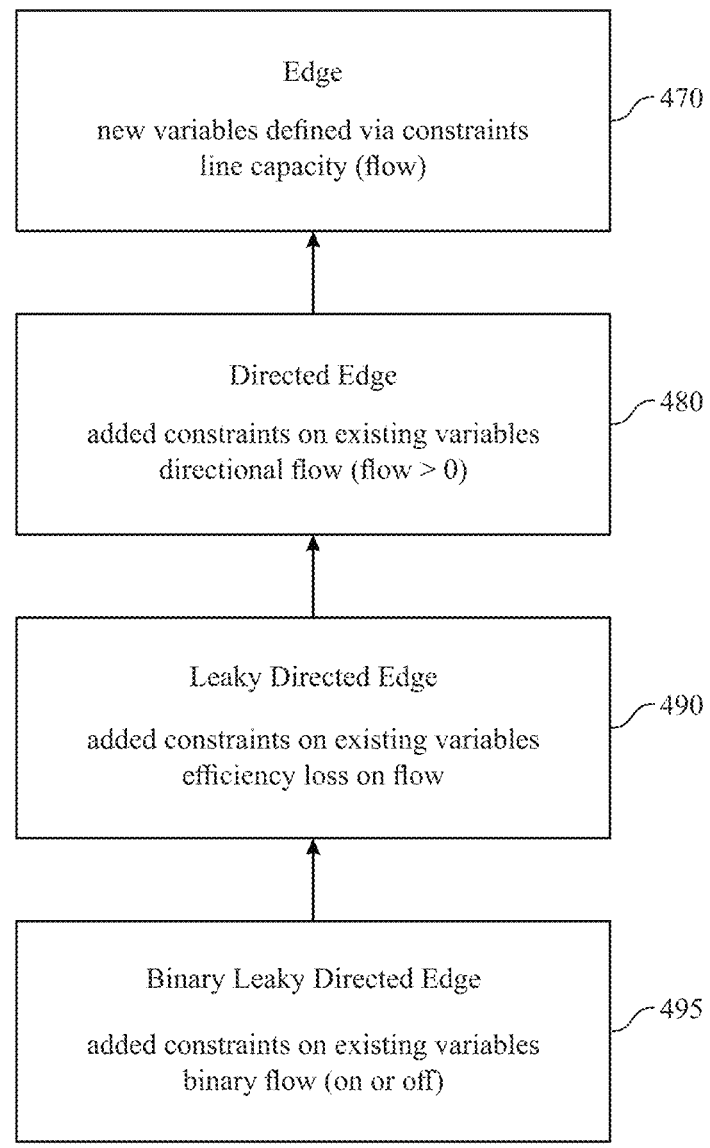

FIGS. 4a and 4b illustrate examples of a specific class inheritance mapping of some of the nodes and edges illustrated in the diagram of FIG. 3. The arrows indicate the direction of inheritance from child to parent. For the nodes illustrated in FIG. 4A, a top-level node, labeled "Node" (410) in FIG. 4A, contains among others, constraints for conservation of energy. In next level in the hierarchy of nodes in FIG. 4A, the "Generator" collection of nodes (420), "Storage" collection of nodes (430), "Solar" collection of nodes (440), and "Load" collection of nodes (450) inherit the constraints of "Node" (410). Each child of "Node" adds constraints specific to their application but inheriting rather than replicating foundational constraints such as conservation of energy. Likewise, the "Water Storage" collection of nodes (430) inherits the class constraints of "Storage" collection of nodes (460) and adds constraints specific to water storage systems. FIGS. 4a and 4b illustrate examples of class inheritance structures; however, as will be appreciated by one of ordinary skill in the art, many different hierarchical configurations of class structures may be used to configure any number of micro-grid power systems.

FIG. 4B illustrates one embodiment for a hierarchical class structure for edges. For this embodiment, top level class, "Edge" (470), enables flow between nodes and incorporates constraints on power flow. The next level in the hierarchy of edges shown in FIG. 4 includes a "Directed Edge" (480) that inherits the constraints of "Edge" (470). In addition, the "Directed Edge" (480) adds constraints on the directionality of flow along the edge. The next level in the hierarchy of edges shown in FIG. 4 includes a "Leaky Directed Edge" (480) that inherits the constraints of "Directed Edge" (480), which include the constraints of "Edge" (470). The "Leaky Directed Edge" (490) class adds constraints related to the efficiency loss on flow. The lowest level class, "Binary Leaky Directed Edge" (495), inherits the constraints from all of its parent classes: "Edge" (470), "Directed Edge" (480) and Leaky Directed Edge (490). At this level, the class structure includes constraints on binary flow, being on or off.

The depth of the Node inheritance tree is shallow with most objects inheriting directly from the parent Node. In some embodiments, the Edge inheritance tree has multiple levels, as there are many different types which build off of each other, from undirected to directed and then adding efficiency constraints or binary toggles. Of interest, it is the parent Node and Edge that apply the conservation of energy constraints. That said, all nodes with all types of edges connected naturally obey these higher-level constraints via this inheritance construct.

In various embodiments, the present disclosure includes the following features:

Using object-oriented programming to form optimization problems, where optimization constraints are successively inherited using class-inheritance.

Formulating all building blocks and children thereof with constraints that are applied in an additive fashion.

Grouping nodes and edges to form dynamical models of power and energy assets.

A method where a grouped set of components exposes a standard asset interface for connecting groups together. The interface of choice is to set an input and output node for making connections with other nodes. Note that the input and output node may be the same node. This abstracts away the inner workings of the components themselves.

The use of the above framework with Model Predictive Control.

The use of the above framework applied to power and energy simulations for grid-connected generation and storage systems and grid-isolated microgrid systems.

The use of the above framework for power and energy market interactions, including making dispatch forecasts and market commitments.

The use of the above framework with Model Predictive Control where the inherited constraints are a function of each simulation timestep. This ensures continuity across objects and time.

The use of the above framework with Model Predictive Control with automatic bootstrapping, described in US Patent Application, "Method for Bootstrapping Model Predictive Control Simulations", inventor, Stephen Schneider, filed concurrently herewith.

Figure 5:
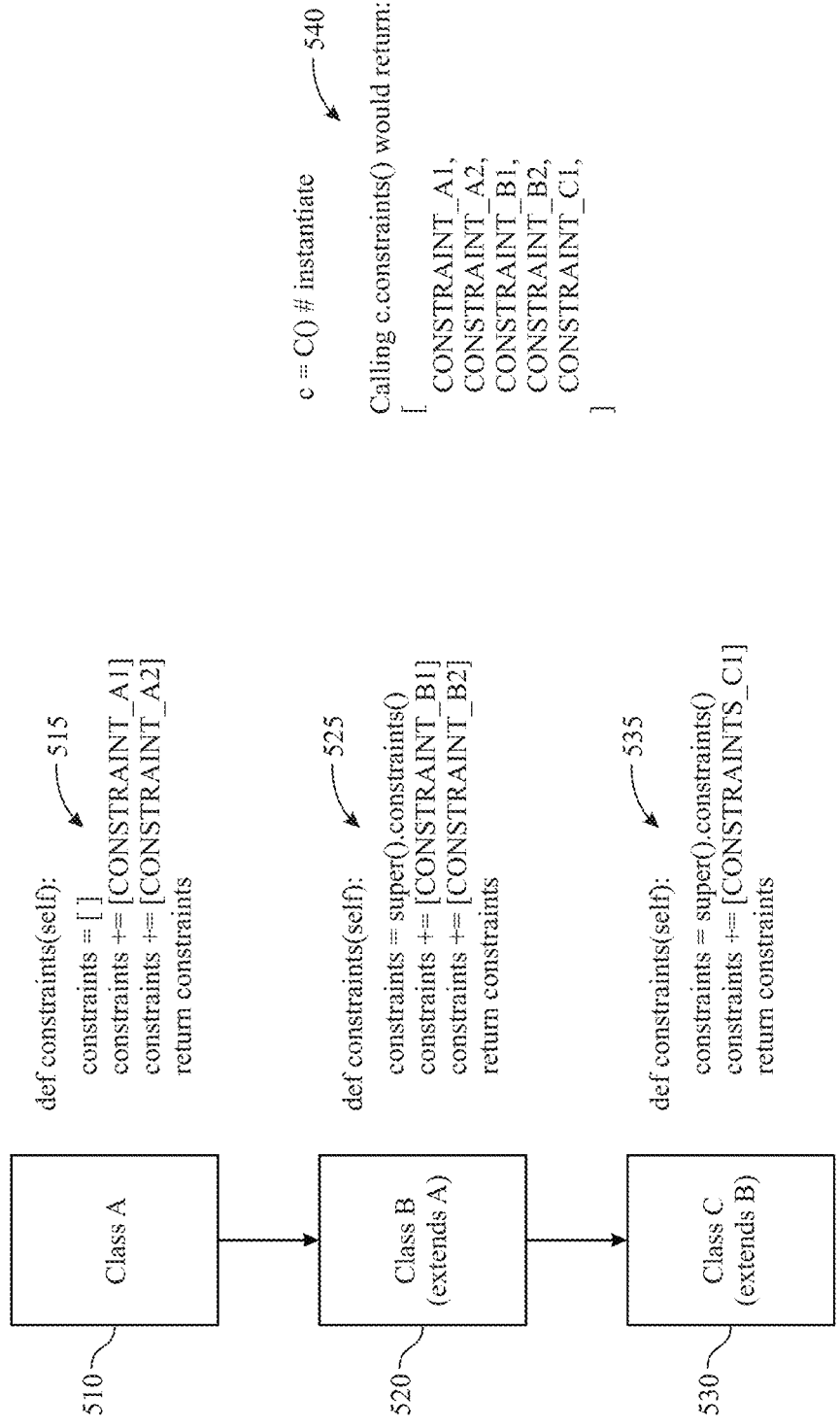
FIG. 5 illustrates examples of class inheritance in accordance with some embodiments of the present invention.

FIG. 5 illustrates examples of class inheritance in accordance with some embodiments of the present invention. The bottom level class, Class A (510), includes contraints, labeled as CONSTRAINT_A1 and CONSTRAINT_A2, as expressed in Python pseudocode 515 shown in FIG. 5. The next level class, Class B (520), includes, in addition the contraints of Class A (510), CONSTRAINT_B1 and CONTRAINT_B2, as expressed in Python pseudocode 525. Class C (530), which extends Class B (520), adds, in addition to the contraints of Class A (510) and Class B (520), CONSTRAINT C1, as expressed in Python pseudocode 535. Thus, the top-level parent class, Class C (530), defines a list of constraints, which is appended as children inherit from their parents, as illustrated in FIG. 5 with Python pseudocode 540.

The nodes and edges are grouped to form dynamical models of power and energy assets. A conscious design choice was made to model complex assets as a collection of components rather than separate implementations. Ultimately, this increases robustness for the assets and reduces the amount of unit tests.

Figure 6:
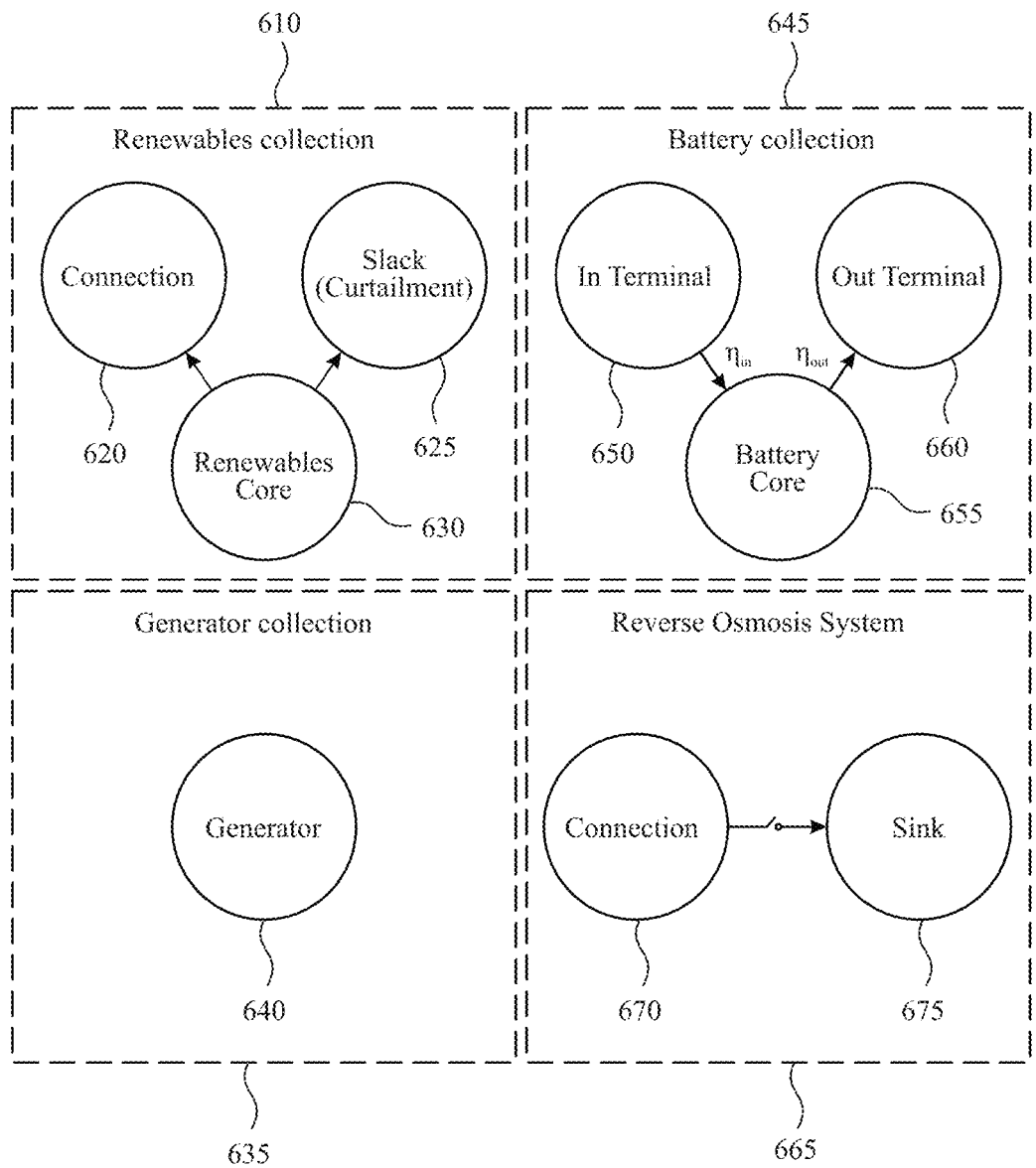
FIG. 6 illustrates example groupings for some basic assets in accordance with some embodiments.

FIG. 6 illustrates example groupings for some basic assets in accordance with some embodiments. Note that the grouping itself adds no constraints on their own, rather they merely establish templates. In some embodiments, a solar system is constructed of a core (generation unit), slack (curtailment), and terminal nodes (connection). Edges direct energy from the core such that core→terminal and core-→slack. As these nodes and edges are connected, large systems are constructed. Constraints and objectives are determined by summing the objectives and constraints of each unit.

Specifically, FIG. 6 shows collections (FIG. 2), represented as a collection of one or more nodes coupled together by edges. For this example, Renewable Collection (610) includes a Renewables Core node (630) coupled to directional edges that flow to Connection (620) and Slack (Curtailment) (625). A battery system is constructed of a battery core (node with charge accumulation), terminal in, terminal out, and leaky edges. The battery core represents the internal capacity of a storage asset. The leaky edges capture the conversion between AC and DC power. In FIG. 6, Battery Collection 645 includes In Terminal (650), and an edge that flows to Battery Core (655), along with Out Terminal (600), with an edge that flows from the Battery Core (655).

Generator Collection (635) is represented simply as Generator (640) in FIG. 6. In some embodiments, a Generator class inherits a source node class and sets a charge accumulation property to be an optimization variable, a time-based vector for MPC. Reverse Osmosis System (665), which consists of a Connection node (670) coupled to a Sink (675), via a binary edge. The Reverse Osmosis System (665) is represented as a binary edge (on or off) that performs some additional conversions. Two nodes are included in the collection as nodes to connect a source and sink (i.e., Connection 670 and Sink (675)).

Advantages of the techniques taught in the present disclosure include, but are not limited to the following.

With the modeling techniques disclosed herein, maintenance of fundamental laws of energy conservation are maintained while permitting abstraction of more complex objects and behaviors. In this way, only marginal complexity is encountered when adding new features.

The modeling techniques disclosed herein further permit visualization of problem implementation prior to executing problem solutions.

Figure 7:
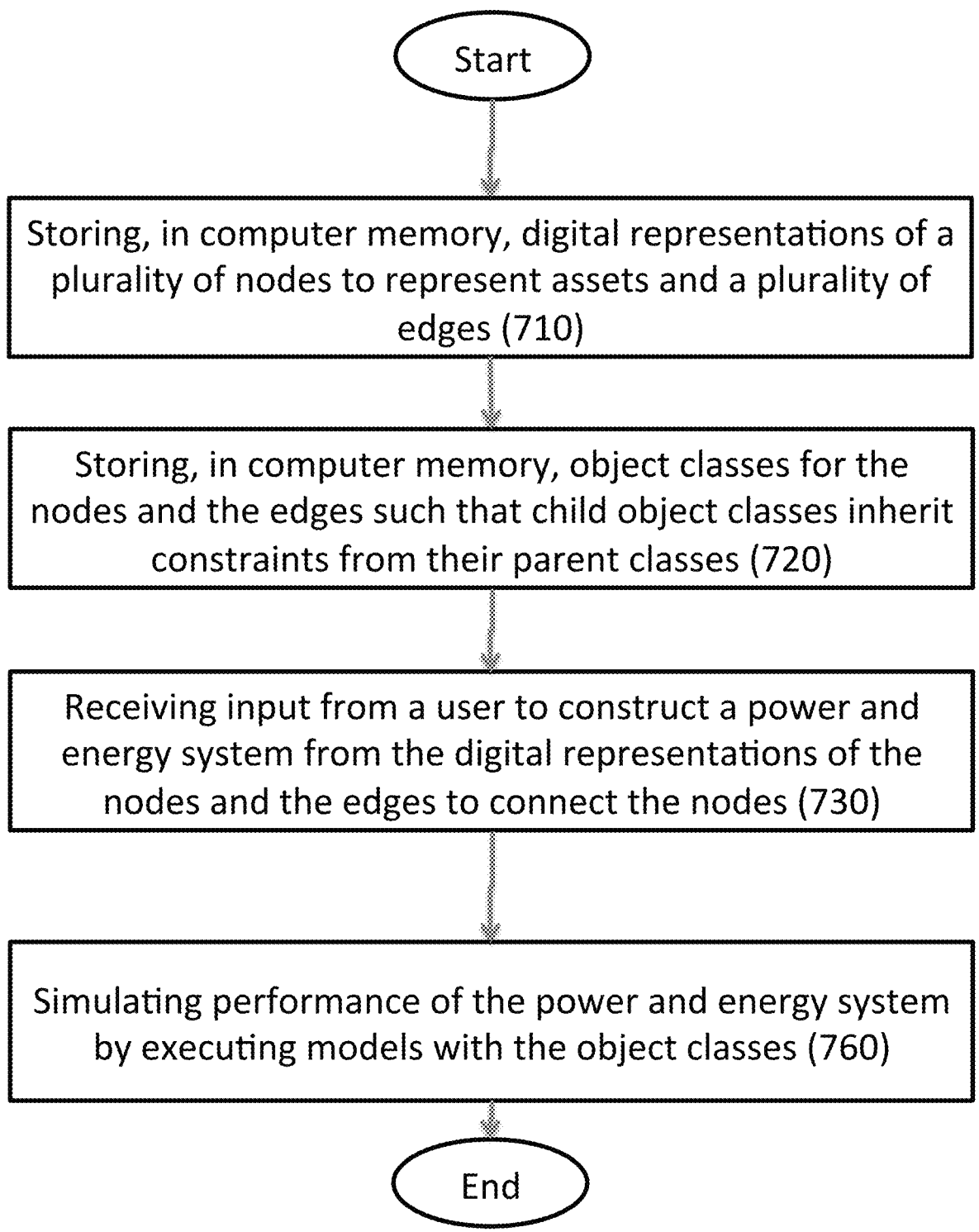
FIG. 7 is a flow diagram illustrating a process for modeling an energy and power system parameters in accordance some embodiments of the present invention.

FIG. 7 is a flow diagram illustrating a process for modeling an energy and power system parameters in accordance some embodiments of the present invention. Digital representations of nodes, corresponding to collections of assets, and edges are stored in computer memory (FIG. 7, 710). Object classes for the nodes and edges are also stored in computer memory (FIG. 7, 720). The object classes are constructed such that child object classes inherent constraints from their parent classes. In order to model asset parameters for a specific power and energy system, the system receives, from a user, input to create a power and energy system from the digital representations of the nodes and the edges to connect the nodes (FIG. 7, 730). Using the power and energy system constructed with nodes and edges, performance parameters of the power and energy system are calculated by executing models with the object classes (FIG. 7, 760).

Figure 8:
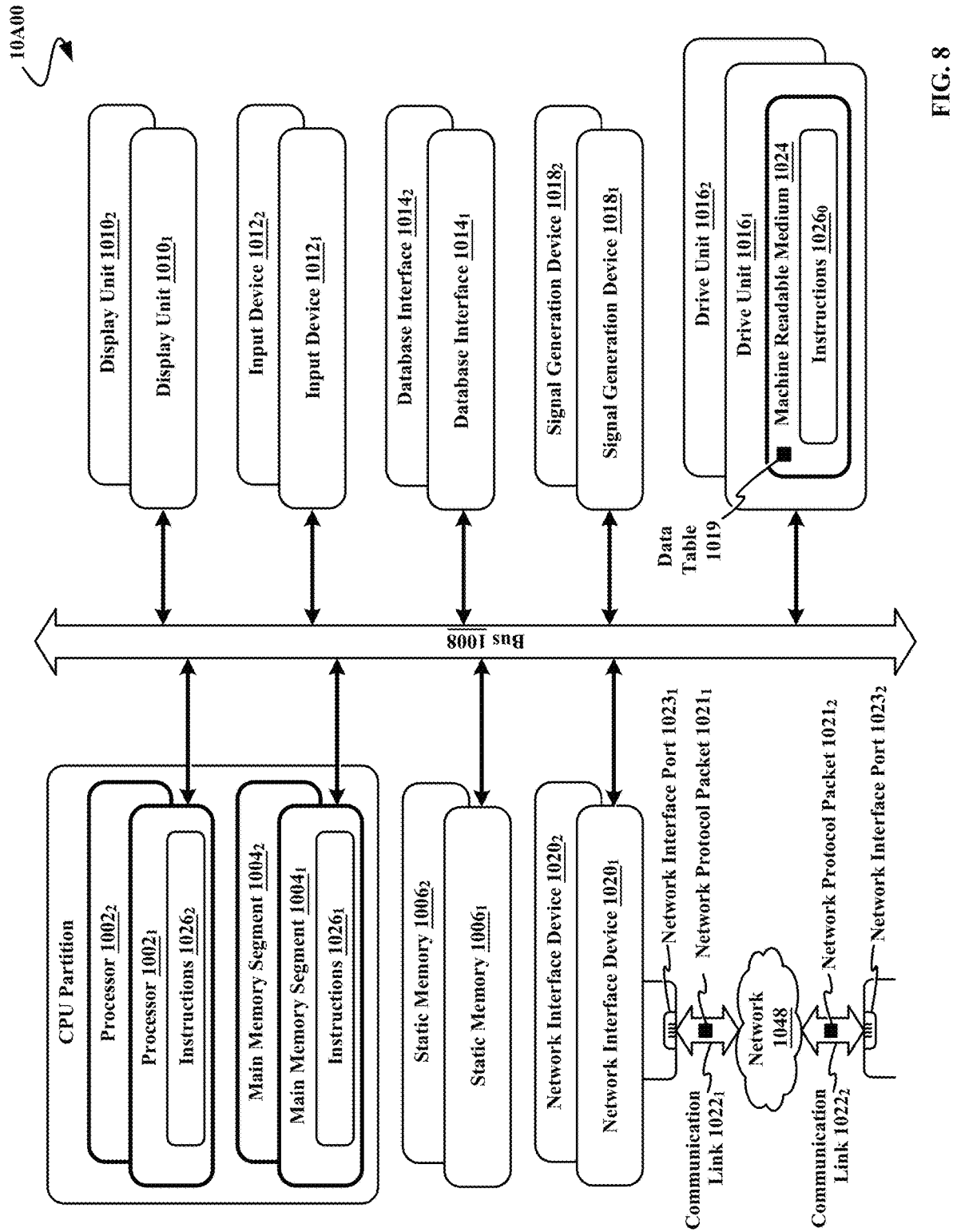
FIG. 8 depicts a diagrammatic representation of a machine in the exemplary form of a computer system within which a set of instructions for causing the machine to perform any one of the methodologies discussed above may be executed.

FIG. 8 depicts a diagrammatic representation of a machine in the exemplary form of a computer system within which a set of instructions for causing the machine to perform any one of the methodologies discussed above may be executed. In alternative embodiments, the machine may comprise a network router, a network switch, a network bridge, a personal digital assistant (PDA), a cellular telephone, a web appliance, or any machine capable of executing a sequence of instructions that specify actions to be taken by that machine.

The computer system 10A00 includes a CPU partition having one or more processors (e.g., processor $1002_1$, processor $1002_2$, etc.), a main memory comprising one or more main memory segments (e.g., main memory segment $1004_1$, main memory segment $1004_2$, etc.), and one or more static memories (e.g., static memory $1006_1$, static memory $1006_2$, etc.), any of which components communicate with each other via a bus 1008. The computer system 10A00 may further include one or more video display units (e.g., display unit $1010_1$, display unit $1010_2$, etc.) such as an LED display, or a liquid crystal display (LCD), a cathode ray tube (CRT), etc. The computer system 10A00 can also include one or more input devices (e.g., input device $1012_1$, input device $1012_2$, alphanumeric input device, keyboard, pointing device, mouse, etc.), one or more database interfaces (e.g., database interface $1014_1$, database interface $1014_2$, etc.), one or more disk drive units (e.g., drive unit $1016_1$, drive unit $1016_2$, etc.), one or more signal generation devices (e.g., signal generation device $1018_1$, signal generation device $1018_2$, etc.), and one or more network interface devices (e.g., network interface device $1020_1$, network interface device $1020_2$, etc.).

The disk drive units can include one or more instances of a machine-readable medium 1024 on which is stored one or more instances of a data table 1019 to store electronic information records. The machine-readable medium 1024 can further store a set of instructions $1026_0$ (e.g., software) embodying any one, or all, of the methodologies described above. A set of instructions $1026_1$ can also be stored within the main memory (e.g., in main memory segment $1004_1$). Further, a set of instructions $1026_2$ can also be stored within the one or more processors (e.g., processor $1002_1$). Such instructions and/or electronic information may further be transmitted or received via the network interface devices at one or more network interface ports (e.g., network interface port $1023_1$, network interface port $1023_2$, etc.). Specifically, the network interface devices can communicate electronic information across a network using one or more optical links, Ethernet links, wireline links, wireless links, and/or other electronic communication links (e.g., communication link $1022_1$, communication link $1022_2$, etc.). One or more network protocol packets (e.g., network protocol packet $1021_1$, network protocol packet $1021_2$, etc.) can be used to hold the electronic information (e.g., electronic data records) for transmission across an electronic communications network (e.g., network 1048). In some embodiments, the network 1048 may include, without limitation, the web (i.e., the Internet), one or more local area networks (LANs), one or more wide area networks (WANs), one or more wireless networks, and/or one or more cellular networks.

The computer system 10A00 can be used to implement a client system and/or a server system, and/or any portion of network infrastructure.

It is to be understood that various embodiments may be used as, or to support, software programs executed upon some form of processing core (such as the CPU of a computer) or otherwise implemented or realized upon or within a machine or computer readable medium. A machine-readable medium includes any mechanism for storing or transmitting information in a form readable by a machine (e.g., a computer). For example, a machine-readable medium includes read-only memory (ROM), random access memory (RAM), magnetic disk storage media, optical storage media, flash memory devices, or any other type of non-transitory media suitable for storing or transmitting information.

A module as used herein can be implemented using any mix of any portions of the system memory, and any extent of hard-wired circuitry including hard-wired circuitry embodied as one or more processors (e.g., processor $1002_1$, processor $1002_2$, etc.).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A computer-implemented method for modeling an energy and power system, comprising:
   storing, in a computer, digital representations of a plurality of nodes, which represent one of a plurality of assets and at least one load, and a plurality of edges, which connect the nodes, for a power and energy network, wherein the assets comprise a generator asset, an energy storage system asset, and a solar system asset;
   storing, in the computer, a plurality of object classes comprising:
      a node object class, wherein the node object class comprises a plurality of constraints that define at least a charge accumulation per time, an energy state and a rate of change;
      a generator object class for the generator asset, which inherits the constraints of the node object class;
      an energy storage object class for the energy storage system asset, which inherits the constraints of the node object class;
      a solar object class for the solar system asset, which inherits the constraints of the node object class;
      a load object class for the load, which inherits the constraints of the node object class;
      an edge object class for the edges, wherein the edge object class comprises constraints that define at least line capacity for the edge;
   providing an interface to the computer to allow a user to model a power and energy system by allowing the user to connect the nodes with the edges and to permit the user to group the nodes and the edges to construct a power and energy system, wherein the object classes for the nodes and the edges, when executed by the computer, implement one or more dynamical models to model power and energy assets.

2. The computer-implemented method as set forth in claim 1, wherein the dynamic models comprise the framework for Model Predictive Control.

3. The computer-implemented method as set forth in claim 2, wherein the use of the framework with Model Predictive Control such that the inherited constraints are a function of each simulation timestep.

4. The computer-implemented method as set forth in claim 1, wherein the power and energy network comprises grid-connected generation, storage systems and grid-isolated microgrid systems.

5. The computer-implemented method as set forth in claim 1, wherein the model comprises modeling energy market interactions, including making dispatch forecasts and market commitments.

6. The computer-implemented method as set forth in claim 1, wherein the nodes manage internal charge for the assets and the edges conduct charge to flow among the nodes such that each of the edges must either accumulate in one of the nodes or disseminate along other of the edges.

7. A simulator for modeling an energy and power system, comprising:
  non-transitory computer-readable storage medium, having stored thereon, a sequence of instructions;
  at least one processor, coupled to the storage medium, that executes the instructions to causes the processor to perform a set of acts comprising:
  storing, in the simulator, digital representations of a plurality of nodes, which represent one of a plurality of assets and at least one load, and a plurality of edges, which connect the nodes, for a power and energy network, wherein the assets comprise a generator asset, an energy storage system asset, and a solar system asset, and to a plurality of object classes comprising:
    a node object class, wherein the node object class comprises a plurality of constraints that define at least a charge accumulation per time, an energy state and a rate of change;
    a generator object class for the generator asset, which inherits the constraints of the node object class;
    an energy storage object class for the energy storage system asset, which inherits the constraints of the node object class;
    a solar object class for the solar system asset, which inherits the constraints of the node object class;
    a load object class for the load, which inherits the constraints of the node object class;
    an edge object class for the edges, wherein the edge object class comprises constraints that define at least line capacity for the edge;
    and
  providing an interface to the simulator to allow a user to model a power and energy system by allowing the user to connect the nodes with the edges and to permit the user to group the nodes and the edges to construct a power and energy system, wherein the object classes for the nodes and the edges, when executed by the simulator, implement one or more dynamical models to model power and energy assets.

8. The simulator as set forth in claim 7, wherein the dynamic models comprise the framework for Model Predictive Control.

9. The simulator as set forth in claim 8, wherein the use of the framework with Model Predictive Control such that the inherited constraints are a function of each simulation timestep.

10. The simulator as set forth in claim 7, wherein the power and energy network comprises grid-connected generation, storage systems and grid-isolated microgrid systems.

11. The simulator as set forth in claim 7, wherein the model comprises modeling energy market interactions, including making dispatch forecasts and market commitments.

12. The simulator as set forth in claim 7, wherein the nodes manage internal charge for the assets and the edges conduct charge to flow a storage medium among the nodes such that each of the edges must either accumulate in one of the nodes or disseminate along other of the edges.

13. A non-transitory computer-readable storage medium comprising a plurality of instructions which, when executed by a computer, cause the computer to perform modeling of an energy and power system, comprising:
  storing, in a computer, digital representations of a plurality of nodes, which represent one of a plurality of assets and at least one load, and a plurality of edges, which connect the nodes, for a power and energy network, wherein the assets comprise a generator asset, an energy storage system asset, and a solar system asset;
  storing, in the computer, a plurality of object classes comprising:
    a node object class, wherein the node object class comprises a plurality of constraints that define at least a charge accumulation per time, an energy state and a rate of change;
    a generator object class for the generator asset, which inherits the constraints of the node object class;
    an energy storage object class for the energy storage system asset, which inherits the constraints of the node object class;
    a solar object class for the solar system asset, which inherits the constraints of the node object class;
    a load object class for the load, which inherits the constraints of the node object class;
    an edge object class for the edges, wherein the edge object class comprises constraints that define at least line capacity for the edge;
  providing an interface to the computer to allow a user to model a power and energy system by allowing the user to connect the nodes with the edges and to permit the user to group the nodes and the edges to construct a power and energy system, wherein the object classes for the nodes and the edges, when executed by the computer, implement one or more dynamical models to model power and energy assets.

14. The non-transitory computer-readable storage as set forth in claim 13, wherein the dynamic models comprise the framework for Model Predictive Control.

15. The non-transitory computer-readable storage as set forth in claim 14, wherein the use of the framework with Model Predictive Control such that the inherited constraints are a function of each simulation timestep.

16. The non-transitory computer-readable storage as set forth in claim 13, wherein the power and energy network comprises grid-connected generation, storage systems and grid-isolated microgrid systems.

17. The non-transitory computer-readable storage as set forth in claim 13, wherein the model comprises modeling energy market interactions, including making dispatch forecasts and market commitments.

18. The non-transitory computer-readable storage as set forth in claim 13, wherein the nodes manage internal charge for the assets and the edges conduct charge to flow among the nodes such that each of the edges must either accumulate in one of the nodes or disseminate along other of the edges.

* * * * *